(12) United States Patent
Teggatz et al.

(10) Patent No.: US 9,553,457 B2
(45) Date of Patent: Jan. 24, 2017

(54) TUNABLE SYNCHRONOUS RECTIFIER

(75) Inventors: Ross E. Teggatz, McKinney, TX (US);
Amer H. Atrash, Dallas, TX (US);
Jonathan R. Knight, Tokyo (JP)

(73) Assignee: TRIUNE SYSTEMS, LLC, Plano, TX (US)

( * ) Notice: Subject to any disclaimer, the term of this patent is extended or adjusted under 35 U.S.C. 154(b) by 652 days.

(21) Appl. No.: 13/616,726

(22) Filed: Sep. 14, 2012

(65) Prior Publication Data
US 2013/0062967 A1 Mar. 14, 2013

Related U.S. Application Data

(60) Provisional application No. 61/534,401, filed on Sep. 14, 2011.

(51) Int. Cl.
*H01F 38/14* (2006.01)
*H02J 5/00* (2016.01)

(52) U.S. Cl.
CPC ............... *H02J 5/005* (2013.01); *H01F 38/14* (2013.01)

(58) Field of Classification Search
CPC .................................. H02J 5/005; H01F 38/14
USPC ......................................................... 307/104
See application file for complete search history.

(56) References Cited

U.S. PATENT DOCUMENTS

| | | | |
|---|---|---|---|
| 7,982,492 B2* | 7/2011 | Atrash et al. | 326/30 |
| 2009/0243397 A1* | 10/2009 | Cook et al. | 307/104 |
| 2012/0235506 A1* | 9/2012 | Kallal et al. | 307/104 |

* cited by examiner

*Primary Examiner* — Hal Kaplan
(74) *Attorney, Agent, or Firm* — Jackson Walker LLP; Christopher J. Rourk

(57) ABSTRACT

A system for power transfer is provided. In one exemplary embodiment, the system includes an inductive power device, such as a device that transmits or receives power over an inductive coupling. For example, an adjustable impedance is coupled to the inductive power device, where the adjustable impedance is used for dynamically controlling the power gain in the inductive power device, such as by damping power generated by circuit impedances, such as inductances, capacitances or resistances, and combinations thereof.

19 Claims, 3 Drawing Sheets

TUNABLE SYNCHRONOUS RECTIFIER

RELATED APPLICATIONS

This application claims priority to U.S. Provisional Application Ser. No. 61/534,401, entitled "TUNABLE SYNCHRONOUS RECTIFIER," filed Sep. 14, 2011, which is hereby incorporated by reference for all purposes.

FIELD OF THE INVENTION

The invention relates to power transfer, and more particularly to an adaptive termination to maximize power transfer in a system utilizing wireless power transfer, including inductive power transfer.

BACKGROUND OF THE INVENTION

Isolated power transfer can be accomplished using coupled inductors. Driving coupled inductors without a means to adjusting the complex load creates several challenges, a significant one being a reduction of power transferred to the secondary or receiver side. Reduction of power reduces the system efficiency as well as limits the amount of power that can be received at the load. Another challenge is providing too much energy on the secondary which can cause a potential for instability. An instable system provides undesirable ringing to the load as well as limiting the system which restricts the maximum system bandwidth.

SUMMARY OF THE INVENTION

A system for power transfer is provided. In one exemplary embodiment, the system includes an inductive power device, such as a device that transmits or receives power over an inductive coupling. For example, an adjustable impedance is coupled to the inductive power device, where the adjustable impedance is used for dynamically controlling the power gain in the inductive power device, such as by damping power generated by circuit impedances, such as inductances, capacitances or resistances, and combinations thereof.

DETAILED DESCRIPTION OF PREFERRED EMBODIMENTS

Figure 1:
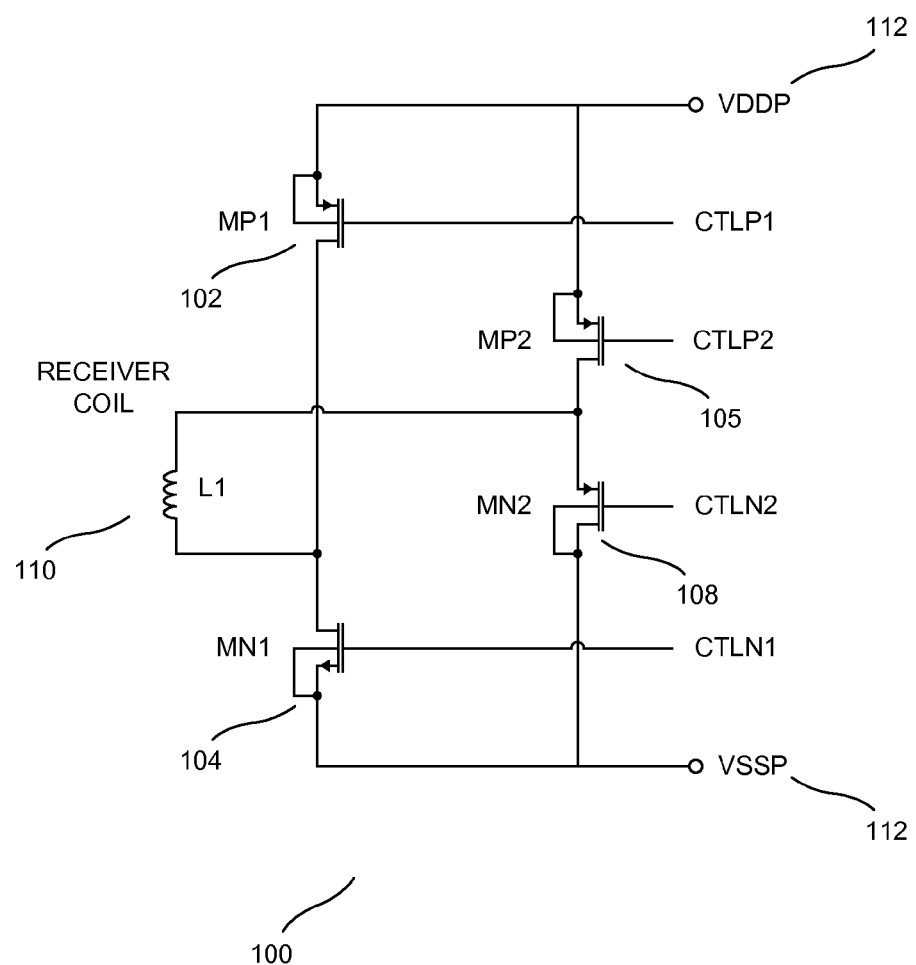
FIG. 1 is a diagram of a system 100 for inductive power transmission in accordance with prior art.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for inductive power transmission in accordance with prior art. System 100 allows inductive power transfer from a primary coil in a transmitter or primary side (not shown) to a secondary receiver coil 110. The alternating current, AC, signal is then rectified through rectifying devices 102, 104, 105, and 108, transferring the AC signal to a direct current, DC, signal 112. Changes in inductive coupling due to frequency, coil placement or primary power can adversely affect the optimization and control of power transferred from the primary side to the secondary side 100.

Figure 2:
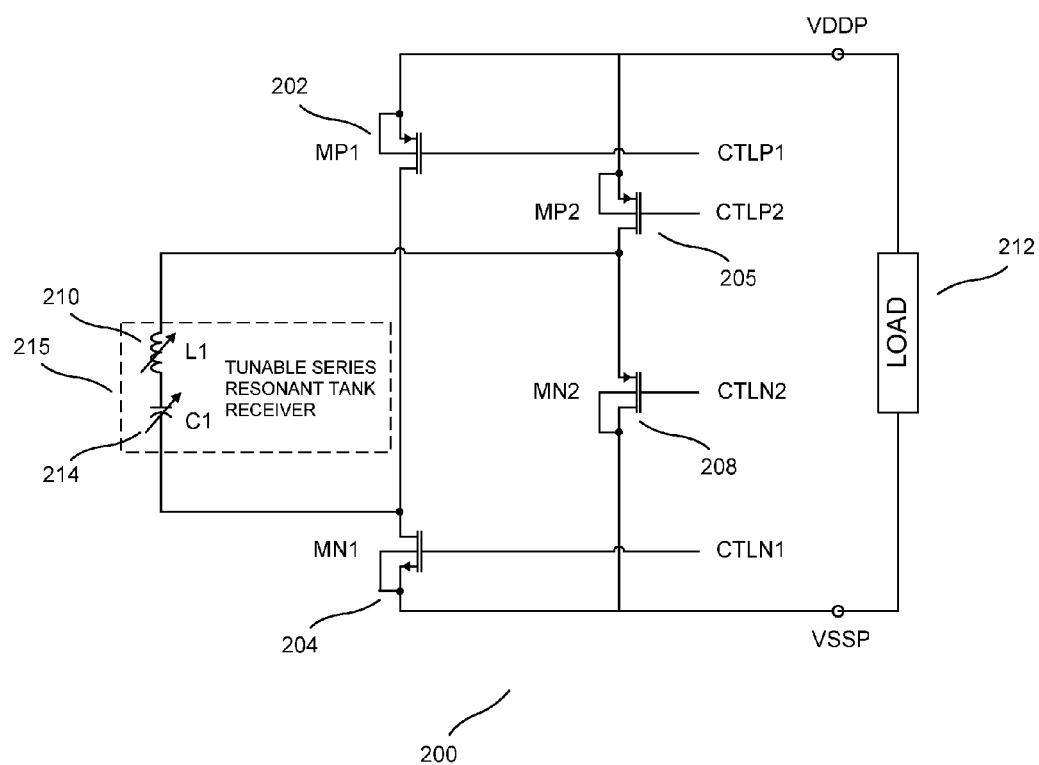
FIG. 2 is a diagram of a system 200 for receiving power over an inductive coupling in accordance with an exemplary embodiment of the present invention.

FIG. 2 is a diagram of a system 200 for inductive power transmission in accordance with an exemplary embodiment of the present invention. System 200 allows inductive power transfer to be optimized by correcting power gain in the received power signal by using an adjustable impedance.

System 200 includes transmitter system which is coupled to the secondary inductor 210. Transmitter system can be a power transmission device such as a inductive transformer, a wireless inductive transmitter, a cellular telephone, a computing device, a computer peripheral, a meter, a device that utilizes wireless telemetry such as a vending machine, a camera, a portable storage device such as USB drive or external/removable hard drive, a calculator or other suitable devices that have inductive power transfer capability.

Adjustable impedance, consisting of the secondary combination of adjustable inductor and adjustable capacitor 215 is coupled to transmitter system via inductive coupling 210. In one exemplary embodiment, inductive coupling 210 can include additional inductances in receiver system 200 and adjustable impedance 215 or receiver system 200, or other suitable systems or components that are used to provide power transfer functionality without the need for a physical or direct connection (such as a wire line connection through a conductor) between transmitter system inductively coupled 210 to and adjustable impedance 215 or receiver system 200. In one exemplary embodiment, adjustable impedance 215 can provide tuning or de-tuning of its resonance to optimize energy contained in or generated by circuit resonances, reflected signals or other signals that can create ringing and that otherwise obscure the inductively transmitted power signals. Adjustable impedance 215 can also or alternatively be used to provide reactive impedances, such as to tune or de-tune a resonant circuit for increased or decreased power transfer from the transmitter system via inductive coupling 210 or for other suitable purposes, where the circuit design is amenable to the use of reactive impedances.

Receiver system 200 is coupled to adjustable impedance 215 and receives power via inductive coupling 210 from transmitter system. In one exemplary embodiment, receiver system 200 can provide feedback to adjustable impedance 215 to alter the resonant frequency by adjusting the amount of impedance when ringing is present or if not enough power is provided to the load 212. AC power is rectified through devices 202, 204, 205, and 208. Receiver system 200 outputs power to load 212 that is received from transmitter system across inductive coupling 210 that is rectified from an AC to DC signal through rectifying devices 202, 204, 205, and 208.

The ability to tune the frequency response of the receiver system 200 by adjustment of the inductor value 210, capacitor value 214, or both, allows for a greater degree of freedom in selecting the optimal transmit/receive frequency and the bandwidth of the receiver network, both of which are critical to optimizing towards the resonant Q-factor.

In operation, system 200 allows power to be inductively coupled 210 from transmitter system to receiver system 200, and adjusts for power losses that may occur as a result of the various impedances involved in the inductive power coupling. Adjustable impedance 215 allows the power gain to be compensated, such as by detecting and correcting the resonant frequency at adjustable impedance 215, by receiving an impedance control signal from receiver system 200, or in other suitable manners.

In one exemplary embodiment, by monitoring the input to the receiver for optimizing power transfer in the in the power stream, system 200 can automatically adjust the impedance to compensate for maximum power transfer to the load 212. In this exemplary embodiment, any combination of the inductive value 210 and capacitive value 214 can be changed using a digital to analog converter (DAC) circuit. If it is determined that the received power is in-sufficient, such as by monitoring the power at load 212, monitoring power through the rectifying devices 202, 204, 205, and 208, monitoring power through the adjustable load 215 by using, analog monitoring or analog or digital oversampling or other suitable power calculating algorithms or techniques that are known to one of skill, then the value of the DAC can be adjusted. The direction of the adjustment can be selected according to a search algorithm, arbitrarily chosen, or otherwise varied, and the received power is then checked again for optimized power to the load 212 to see if the power provided was improved or made worse, thereby determining whether the direction was correct or not, and providing information for the next adjustment.

The amount of the combination inductance and capacitance that is required to tune the resonance of the adjustable impedance 215 without causing unacceptable power attenuation or gain is a function of the external circuit components such as the inductances and air gaps, as well as the parasitic capacitance at the transmitter and receiver. The optimum adjustable impedance 215 may vary over time due to temperature, component value variations, inductor alignment, or other effects. System 200 dynamically adjusts the impedance value to provide optimum performance.

The advantages of system 200 include a simplified system architecture, no need for modification to the operation of the transmitter system, a receiver impedance that is determined automatically by the adaptive control, a robustness to temperature and system variation, automatic recalibration that compensates for changes over time and temperature, and optimized power output performance to the load 212. Further, the system 200 can be configured as a receive, transmit, or transmit and receive configuration.

Figure 3:
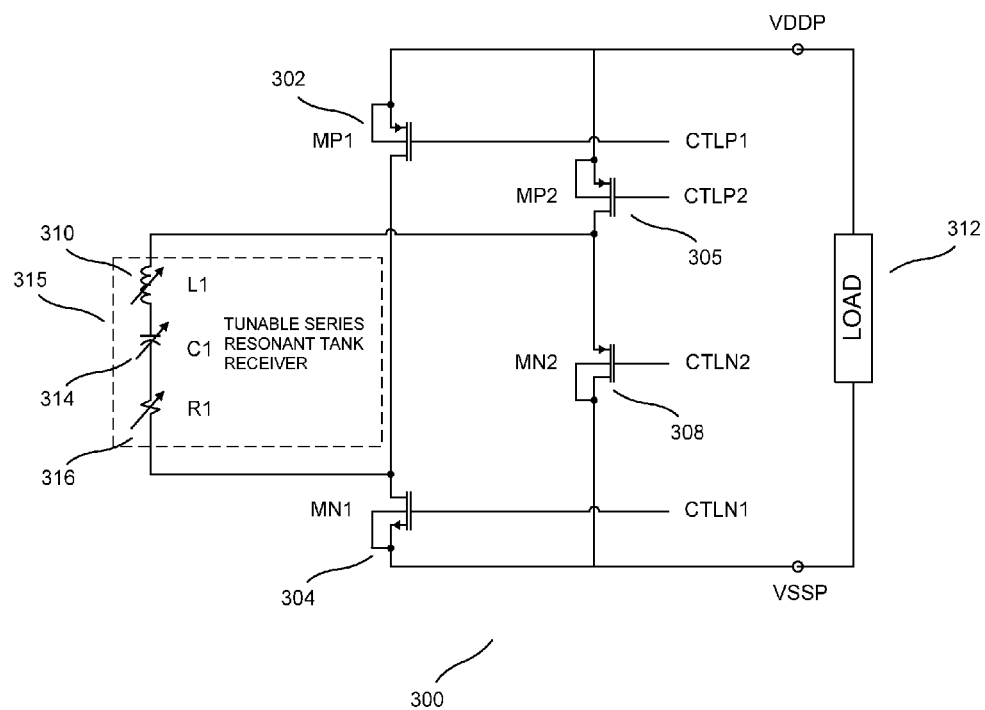
FIG. 3 is a diagram of an alternative system 300 for damping in an inductive power coupling in accordance with an exemplary embodiment of the present invention.

FIG. 3 is a diagram of a system 300 for receiving data over an inductive coupling in accordance with an exemplary embodiment of the present invention. System 300 includes adjustable impedance 315, which is coupled to the rectifying devices 302, 304, 305, and 308, and load 312. Tunability of the adjustable impedance 315 component parameters can be implemented through the use of a switching network that switches any combination of multiple inductors with adjustable inductor 310 (or multiple coil taps in the case of a multi-tap coil) with any combination of multiple capacitors which make up adjustable capacitor 314. An alternate embodiment of the proposed receiver circuit would include a resistor in series with L1 and C1 to "de-Q" the circuit if so desired in order to spread the bandwidth of the receiver to allow for a wider range of transmit frequencies In one exemplary embodiment, adjustable impedance 315 the resonant circuit Q value can be reduced by introducing a series resistance 316 with adjustable inductor 310 and adjustable capacitor 314. By introducing the adjustable resistor 316, the circuit allows a wider spread to the bandwidth of the receiver system 300 to allow for a wider range of transmit frequencies.

The combination of adjustable load 315, can be adjusted by monitoring the load 212, monitoring the rectifying devices 302, 304, 305, and 308, or monitoring the adjustable impedance 315, such as by using an analog monitoring or analog or digital oversampling or other suitable power calculating algorithms or techniques that are known to one of skill, then the value of the DAC can be adjusted. The direction of the adjustment can be selected according to a search algorithm, arbitrarily chosen, or otherwise varied, and the received power is then checked again for optimized power to the load 312 to see if the power provided was improved or made worse, thereby determining whether the direction was correct or not, and providing information for the next adjustment.

Adjustable resistor 316 can be placed in parallel with adjustable inductor 310 and adjustable capacitor 314. This parallel resistor can also be a dynamic tunable resistor which is inversely proportional to the load 315 of the system. This can provide an effective DC load which reduces the likelihood of noise transfer from the secondary to the primary side. This can be used to better improve the signal to noise of data coming from the secondary to the primary. The impedance of adjustable resistor 316, in either a parallel or series configuration, can also be realized dynamically through the use of a complex load which can consist of inductors, capacitors, resistors, and active circuits such as amplifier and switching circuits. This allows for the energy during the dynamic loading to be stored and then later directed to the load 312.

Implementations of the adjustable impedance 315 using an inductor and resistor in series or an inductor and resistor in parallel can also be used. Another implementation is using an inductor in parallel with a resistor and capacitor in series.

Other system implementations that can be used for both the power transmit and power receive is a LLC type of configuration where L is in parallel with a series LC. In this case any combination of the LLC components can be made tunable. This type of configuration can be used to mitigate switching losses.

A key advantage of tunable components is to provide a means to modulate the effective coupling factor of the coupled primary and secondary coils without having to provide significant frequency shift driven by the transmitter. This can aid in the control and stability of the system as well as provide a more robust EMI system because the frequency of power transmission is appreciably limited or fixed using tunable passive components.

A complementary approach to using a resonant power transfer system to improve efficiency is to use a small storage capacitor at the output of the rectifier devices 302, 304, 305, and 308. This will distribute the period of current flow to charge the storage capacitor over a longer period of time, thereby reducing the peak value and the losses in the rectifier transistors. In a practical system implementation, this may mean following the rectifier devices 302, 304, 305, and 308 and load 312 with a switching regulator whose closed-loop bandwidth is sufficiently high to track the large ripple voltage.

The system 300 can be configured as a receive, transmit, or transmit and receive configuration.

All implementations shown or discussed can use any combination of tuned or non-tuned components in conjunction with a rectifying circuit which may include synchronous full bridge or half bridge configurations. Alternatively a center tapped inductor with adjustable impedance can be used in conjunction with a rectifying circuit which may include a synchronous bridge configuration.

The rectifying circuit can be any combination of rectification schemes such a single switch, half bridge, full bridge, or star.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for power transfer comprising:
an inductive power device;
an adjustable impedance coupled to the inductive power device, the adjustable impedance for dynamically controlling the gain in the inductive power device; and
an impedance controller for setting an impedance value of the adjustable impedance, wherein the impedance controller is configured to periodically determine whether optimized power is present in a received power signal and to adjust the impedance value of the adjustable impedance to reduce attenuation of the received power signal.

2. The system of claim 1 further comprising a receiver coupled to the inductive power device, wherein the receiver is configured to receive a power signal and generate a control signal for the adjustable impedance in response to the power signal.

3. The system of claim 2 wherein the receiver further comprises a power monitor for determining whether optimized power is present in the load.

4. The system of claim 3 wherein the power monitor further comprises a current and voltage monitor.

5. The system of claim 1 further comprising a transmitter coupled to the inductive power device, wherein the transmitter is configured to transmit a power signal and receive a control signal for the adjustable impedance in response to the power signal.

6. The system of claim 1 wherein the impedance controller is configured to vary the adjustable impedance based on an algorithm so as to optimize the impedance value of the adjustable impedance to reduce ringing without excessive attenuation of a received signal.

7. The system of claim 1 wherein the impedance controller is configured to periodically determine whether ringing is present in a received power signal and to adjust the impedance value of the adjustable impedance to reduce the ringing if ringing is present.

8. The system of claim 1 wherein the inductive power device comprises one of a cellular telephone, a computer device, a meter reading data, a computer peripheral, a camera, a portable storage device, a calculator or a telemetry device.

9. A system for power transfer comprising:
an inductive power device, the inductive power device including a plurality of coupling inductances and a plurality of capacitances;
an adjustable impedance coupled to the inductive power device, the adjustable impedance for controlling power gain in the inductive power device, wherein optimized power to a load is generated by one or more of the plurality of coupling inductances and the plurality of capacitances;
a receiver coupled to the inductive power device, wherein the receiver is configured to receive a power signal and generate a control signal for the adjustable impedance in response to the power signal;
a power monitor for determining whether optimized power is present at the load; and
an impedance controller for setting an impedance value of the adjustable impedance, wherein the impedance controller comprises means for varying the adjustable impedance to optimize the impedance value of the adjustable impedance to reduce ringing without excessive attenuation of a received signal.

10. A method for receiving power comprising:
receiving a power signal at an inductive power device;
dynamically adjusting an impedance value of an adjustable impedance circuit coupled to the inductive power device to control power gain in the inductive power device;
generating a control signal for adjusting the adjustable impedance in response to the power signal;
determining whether ringing is present in the power signal after adjusting the adjustable impedance; and
modifying the control signal if ringing is present in the power signal.

11. The method of claim 10 wherein determining whether ringing is present in the power signal comprises determining whether an optimized power is present in the power signal.

12. The method of claim 10 wherein dynamically adjusting the impedance value comprises adjusting the adjustable impedance circuit coupled to the inductive power device to control tuning in the inductive power device.

13. A method for receiving power comprising:
receiving a power signal at an inductive power device;
dynamically adjusting an impedance value of an adjustable impedance circuit coupled to the inductive power device to control power gain in the inductive power device; and
decreasing the adjustable impedance to reduce ringing.

14. A method for receiving power comprising:
receiving a power signal at an inductive power device;
dynamically adjusting an impedance value of an adjustable impedance circuit coupled to the inductive power device to control power gain in the inductive power device; and
increasing the adjustable impedance to reduce attenuation of the power signal.

15. A method for receiving power comprising:
receiving a power signal at an inductive power device;
dynamically adjusting an impedance value of an adjustable impedance circuit coupled to the inductive power device to control power gain in the inductive power device;
periodically determining whether optimized power is present in the power signal; and
adjusting the impedance value of the adjustable impedance to optimize power to the load.

16. A method for receiving power comprising:
receiving a power signal at an inductive power device;
dynamically adjusting an impedance value of an adjustable impedance circuit coupled to the inductive power device to control power gain in the inductive power device;
periodically determining whether ringing is present in the received power signal; and adjusting the impedance value of the adjustable impedance to reduce attenuation of the received power signal if ringing is not present.

17. A system for power transfer comprising:
an inductive power device;
an adjustable impedance coupled to the inductive power device, the adjustable impedance for dynamically controlling the gain in the inductive power device; and
an impedance controller for setting an impedance value of the adjustable impedance, wherein the impedance controller is configured to periodically determine whether ringing is present in a received power signal and to adjust the impedance value of the adjustable impedance to reduce the ringing if ringing is present.

18. The system of claim 17 further comprising a receiver coupled to the inductive power device, wherein the receiver is configured to receive a power signal and generate a control signal for the adjustable impedance in response to the power signal.

19. The system of claim 18 wherein the receiver further comprises a power monitor for determining whether optimized power is present in the load.

\* \* \* \* \*